T. LARSSON.
PLUNGER HYDRAULIC ELEVATOR.
APPLICATION FILED NOV. 6, 1912.
Reissued Jan. 14, 1913. 13,512.
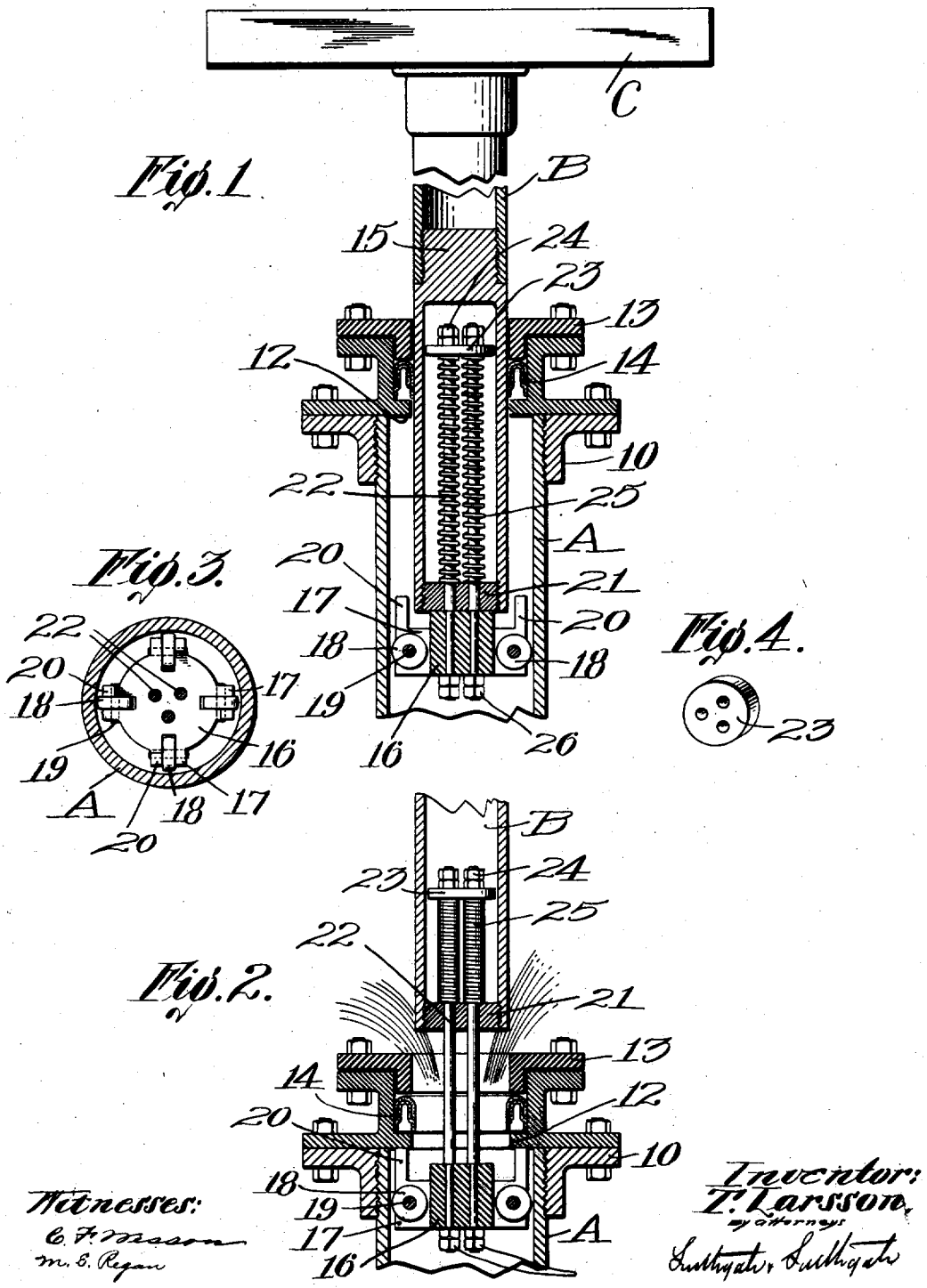

UNITED STATES PATENT OFFICE.

THURE LARSSON, OF WORCESTER, MASSACHUSETTS, ASSIGNOR TO HIMSELF AND FRED A. JONES, OF WORCESTER, MASSACHUSETTS, AND WILLIAM E. D. STOKES, OF NEW YORK, N. Y.

PLUNGER HYDRAULIC ELEVATOR.

13,512. Specification of Reissued Letters Patent. Reissued Jan. 14, 1913.

Original application filed August 1, 1904, Serial No. 219,138. Renewed December 16, 1909, Serial No. 533,397. Original No. 963,905, dated July 12, 1910. Application for reissue filed November 6, 1912. Serial No. 729,747.

*To all whom it may concern:*

Be it known that I, THURE LARSSON, now a citizen of the United States of America, residing at Worcester, county of Worcester, and State of Massachusetts, have invented a new and useful Plunger Hydraulic Elevator, of which the following is a specification.

The object of this invention is to improve that type of hydraulic elevators which are known as plunger hydraulic elevators. This type of elevator consists of a cylinder usually sunk into the ground the distance of travel of the elevator car, fitting into which is a plunger or ram of smaller diameter which works through a stuffing box secured to the top of the cylinder. By admitting water under pressure into the cylinder the ram or plunger is ejected or lifted to raise the car, and by allowing water to flow from the cylinder the plunger descends in the cylinder allowing the car to come down. In an elevator of this class it has been found desirable to provide the plunger at its lower end with guiding means to engage the inside of the cylinder to prevent the end of the plunger from scraping or wearing on the cylinder in case the mechanism is out of line and to prevent the plunger from vibrating or swaying in its movements. This guiding means, of course, has to be of a size to fit or approximately to fit to the inside of the cylinder and hence is larger than the internal diameter of the stuffing box. The use of such guiding mechanism has introduced a factor of danger, in that if control is lost of the plunger on its upward movement and if the plunger runs beyond its normal limit of upward travel the guiding means will be brought violently against the stuffing box which will tend to break and destroy the same. To overcome this difficulty, it has been proposed to provide the lower end of the plunger with a resilient guiding means so that the end of the plunger with the guiding means attached thereto can be inserted into or ejected out through the stuffing box. While this device has proved advantageous, it is open to several objections among which may be noted that a resilient guiding mechanism does not afford as accurate a working device as one which is non-resilient owing to wear and the unstable nature of a resilient mechanism and that, with this mechanism, if the plunger should exceed its upward normal travel the same will be thrown out of the stuffing box and this ejection may take place with considerable speed, whereby the plunger, as soon as its momentum is overcome, may drop back on top of the stuffing box or laterally clear of the stuffing box and cause a serious accident. To overcome these difficulties, the mechanism shown and described in this application has been devised.

The invention consists in providing a guiding mechanism which cannot escape through the stuffing box and in so arranging the parts that when the plunger exceeds its normal upward travel the working part of the plunger will move out of the stuffing box and allow the water to escape to stop the upward movement of the plunger, whereby a relief is obtained without allowing the plunger to escape from the control of its guiding mechanism or to jump laterally off of the stuffing box.

The preferred form of device consists essentially of a guiding means separably or yieldingly connected with the lower end of the plunger by a reduced connection. This guiding means is preferably made non-resilient so as to work accurately under all conditions. The connection between the guiding means and the plunger is preferably made to have a spring tension so that the guiding means will normally tend to take its place at the end of the plunger. With this arrangement, if derangement should take place and the plunger exceed its upward limit of travel, the separable guiding means will engage the stuffing box, as the plunger continues its upward movement, and the yielding connection will allow the plunger to escape from the top of the stuffing box. The engagement of the guiding means with the stuffing box thus will be an easy one without putting a heavy blow thereon. So soon as the plunger escapes from the stuffing box the water will be free to escape at the top of the stuffing box and hence the upward movement of the plunger will stop, but the plunger, while separated from the guiding means, is still connected thereto by the yielding connection so that as the plunger drops back it will be obliged to reënter the stuffing box, whereby the same cannot escape laterally to allow the car to fall. When the plunger is restored to normal position in the stuffing box the same again takes up the guiding mechanism at its lower end and the parts are restored to proper working condition. Thus liability of accident from the above causes is practically eliminated.

The mechanism also affords a convenient means by which the plunger can be raised clear of the stuffing box for the purpose of getting at the stuffing box for repairing or adjusting the same.

The mechanism also has the advantage of practically forming a spring buffer for limiting the upward motion of the plunger at the lower end thereof.

The improvements are shown in the accompanying drawings, referring to which, Figure 1 is a sectional elevation of a plunger elevator equipped with the invention. Fig. 2 is a partial sectional view illustrating the operation. Fig. 3 is a plan view of the guiding means and Fig. 4 is a perspective view of a detail hereinafter described.

Referring to the drawings and in detail A designates the cylinder, B the plunger, and C the car of an ordinary plunger hydraulic elevator. Screwed on the top of the cylinder A is a flange plate 10 bolted to which is the stuffing box. The stuffing box has an inwardly extending flange 12 which is bored or cored out so as to have a hole thereto slightly larger than the diameter of the plunger. Fitted into the top of the stuffing box is a follower plate 13 which is bolted to the top of the stuffing box and arranged between which and said flange 12 is a suitable packing 14. Screwed into the bottom of the plunger B is a hollow cylinder 15 which is closed at its upper end and which practically forms a continuation of the plunger.

A guiding mechanism is arranged on the lower end of the plunger. This guiding mechanism preferably is made non-resilient. The same consists of a part 16 which has a number, preferably four pairs of extending ears or lugs 17. Fitted between each pair of lugs is a guiding wheel or roll 18 which is journaled on an axle 19 driven into or secured in each pair of lugs. The wheels 18 are curved on their outer periphery so that the same will just clear the inside of the cylinder, as shown in Fig. 3. This forms an efficient guiding mechanism, because if the plunger tends to sway or to crowd to one side the proper roll or rolls will engage the inside of the cylinder and accurately and easily guide the lower end of the plunger. Extending up from the part 16 are ears or projections 20 which come in line to engage the flange 12 of the stuffing box.

The guiding means is separably and yieldingly attached to the lower end of the plunger by the following connections. A plug 21 is screwed in the lower part of the hollow cylinder 15. Fitted to pass through the same are a plurality of rods 22. Three rods, as shown, may be employed to good advantage. On the top of said rods is fitted a plate 23 and nuts 24 are threaded on the ends of said rods 22. Springs 25 are arranged on each of said rods between said plate 23 and plug 21. The plate 23 fits fairly closely to the inside of the hollow cylinder 15. The lower ends of the rods 22 are extended down through holes bored in the part 16 of the guiding mechanism and nuts 26 are screwed on the lower ends of said rods to secure the guiding mechanism rigidly to said rods.

The springs 25 are normally adjusted so as to keep the guiding mechanism snugly up against the lower end of the plunger as shown in Fig. 1, so that as the plunger runs up and down the lower end thereof will be guided in the manner previously described. If now the plunger, for any reason, should exceed the normal limit of upward travel, the projections 20 will engage the flange 12 of the stuffing box, thus detaining the guiding means in the cylinder and the continued upward movement of the plunger will cause the same to separate from the guiding means until the end of the plunger, which is the lower end of the hollow cylinder 15, escapes from the stuffing box and allows a relief of pressure by the escape of water beneath the lower end of the plunger through the stuffing box, as shown in Fig. 2. The impact of the guiding means against the flange 12 will be an easy one owing to the relief afforded by the springs 25 and the substantial dash pot action which takes place as the hollow cylinder 15 moves upward on the plate 23.

When the plunger separates from the guiding means, as shown in Fig. 2, it will not be entirely disconnected therefrom as the rods 22 will still connect these parts, whereby the plunger cannot escape laterally; and whereby, when the plunger again descends or is allowed to descend, it will be properly guided down into the stuffing box to again take up the guiding means. The rods thus form a reduced yielding separable connection between the lower working end of the plunger and the guiding means, the lower end 15 of the plunger practically comprising or containing this peculiar connection. It will also be noted that the guiding means attached to the lower end of the plunger by this yielding or spring or combined spring and dash pot connection performs an important function in addition, in that it will check the upward run of the plunger with a yielding or spring action, thus acting as a spring buffer to limit its movement. It is desirable to check the abnormal run of the plunger at this point instead of at the top of the elevator well, because if the abnormal run is checked at the upper point the top of the car may be broken or the plunger may be buckled as the moving force is applied, of course, at the bottom or end of the plunger. By checking the upward run of the plunger at its lower end with the yielding action, as previously described, no strain is put upon the entire length of the plunger.

The details herein shown and described may be greatly varied by a skilled mechanic without departing from the scope of my invention as expressed in the claims.

Having thus fully described my invention what I claim and desire to secure by Letters-Patent is:—

1. The combination with a cylinder, plunger and stuffing box of a hydraulic elevator, of a guiding means consisting of a part carrying a number of journaled wheels or rolls and a separable or yielding connection between said guiding mechanism and the lower end of the plunger.

2. The combination with a cylinder, plunger and stuffing box of a hydraulic elevator, of a guiding mechanism for the lower end of the plunger, and a spring connection between the guiding means and the lower end of the plunger housed within the lower end of the plunger.

3. The combination with a cylinder, plunger and stuffing box of a hydraulic elevator, of a guiding means for the lower end of the plunger, rods extending therefrom up into the lower end of the plunger, and springs on said rods to form a yielding connection.

4. The combination with a cylinder, plunger and stuffing box of a hydraulic elevator, of a guiding means for the lower end of the plunger, and a yielding connection between said guiding means and the lower end of the plunger having provision for a dash pot action.

5. The combination with a cylinder, plunger and stuffing box of a hydraulic elevator, of a guiding means for the lower end of the plunger, rods extending therefrom up through a plug screwed in the end of the plunger, springs on said rods, and a plate carried by said rods to form a dash pot.

6. The combination with a cylinder, plunger and stuffing box of a hydraulic elevator, of a hollow cylinder attached to the lower end of the plunger and forming a continuation thereof, a plug screwed in the lower end of said hollow cylinder, a guiding means for the lower end of the plunger, rods extending from said guiding means through said plug, springs on said rods and a plate carried by said rods.

7. The combination with the cylinder, plunger and stuffing box of a hydraulic elevator, of a stop or buffer depending from the lower end of the plunger for limiting the upward movement thereof, and a spring connection between the stop and the end of the plunger.

8. The combination with a cylinder, plunger and stuffing box of a hydraulic elevator, of a stop carried by the lower end of the plunger for limiting the upward movement thereof, and a dash pot interposed in the connection between the same and the plunger.

9. The combination with a cylinder, plunger and stuffing box of a hydraulic elevator, of a yielding stopping device connected with the lower end of the plunger by a reduced connection and adapted to arrest the upward travel of the plunger and allow water to escape from the stuffing box.

10. The combination with a cylinder, plunger and stuffing box of a hydraulic elevator, of a guiding means yieldingly connected by a reduced connection with the lower end of the plunger, whereby said guiding means will act as a spring buffer to limit the upward movement of the plunger and the reduced connection will allow an escape of water from the top of the stuffing box.

11. A vertical plunger having a rigid guiding device resiliently depending from its lower end.

In testimony whereof I have hereunto set my hand, in the presence of two subscribing witnesses.

THURE LARSSON.

Witnesses:
LOUIS W. SOUTHGATE,
C. FORREST WESSON.

Copies of this patent may be obtained for five cents each, by addressing the "Commissioner of Patents, Washington, D. C."